US012131734B2

(12) United States Patent
Kushima et al.

(10) Patent No.: US 12,131,734 B2
(45) Date of Patent: Oct. 29, 2024

(54) COMMUNICATION DATA LOG PROCESSING APPARATUS, COMMUNICATION DATA LOG PROCESSING METHOD, AND STORAGE MEDIUM STORING PROGRAM

(71) Applicant: KABUSHIKI KAISHA TOSHIBA, Tokyo (JP)

(72) Inventors: Tsuyoshi Kushima, Kawasaki (JP); Takami Yoshida, Kamakura (JP); Kenji Iwata, Machida (JP); Yuka Kobayashi, Seto (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 294 days.

(21) Appl. No.: 17/652,558

(22) Filed: Feb. 25, 2022

(65) Prior Publication Data

US 2023/0062115 A1 Mar. 2, 2023

(30) Foreign Application Priority Data

Sep. 1, 2021 (JP) ................. 2021-142616

(51) Int. Cl.
*G10L 15/22* (2006.01)
*G10L 15/05* (2013.01)
*G10L 15/26* (2006.01)

(52) U.S. Cl.
CPC .............. *G10L 15/22* (2013.01); *G10L 15/05* (2013.01); *G10L 15/26* (2013.01)

(58) Field of Classification Search
CPC ......... G10L 15/26; G10L 15/02; G10L 15/08; G10L 15/22; G10L 17/02; G10L 15/05; G10L 15/04; G10L 2015/088; G10L 25/78

See application file for complete search history.

(56) References Cited

U.S. PATENT DOCUMENTS

| | | | | |
|---|---|---|---|---|
| 6,052,657 A | * | 4/2000 | Yamron | G06F 16/313 707/E17.084 |
| 8,165,134 B2 | * | 4/2012 | Ito | H04L 43/00 370/395.5 |
| 11,269,831 B2 | * | 3/2022 | Morimoto | G06F 16/2228 |

(Continued)

FOREIGN PATENT DOCUMENTS

| | | | | |
|---|---|---|---|---|
| CN | 107210034 A | * | 9/2017 | G10L 15/02 |
| CN | 107211058 A | * | 9/2017 | G06F 16/61 |

(Continued)

OTHER PUBLICATIONS

Japanese Office Action issued Apr. 9, 2024 in Japanese Patent Application No. 2021-142616 (with unedited computer-generated English Translation), 6 pages.

*Primary Examiner* — Vijay B Chawan
(74) *Attorney, Agent, or Firm* — Oblon, McClelland, Maier & Neustadt, L.L.P.

(57) ABSTRACT

According to one embodiment, a communication data log processing apparatus includes a processor including hardware. The processor receives communication data contained in a communication data log as a log of the communication data containing a speech sentence and meta information. The processor determines a section to which the received communication data should belong based on the speech sentence and the meta information.

15 Claims, 9 Drawing Sheets

(56) References Cited

U.S. PATENT DOCUMENTS

| | | | | |
|---|---|---|---|---|
| 11,741,945 B1* | 8/2023 | Sullivan | ................. | G10L 15/07 704/270.1 |
| 2007/0260564 A1* | 11/2007 | Peters | ..................... | G06F 40/20 707/E17.084 |
| 2008/0201130 A1* | 8/2008 | Peters | ..................... | G06F 40/10 704/9 |
| 2017/0359393 A1* | 12/2017 | Rajagopal | ............... | G10L 15/04 |
| 2018/0218738 A1* | 8/2018 | Gorodetski | ............ | G10L 17/04 |

FOREIGN PATENT DOCUMENTS

| | | | | |
|---|---|---|---|---|
| CN | 116547746 A | * | 8/2023 | ............ G06F 3/167 |
| JP | 2007-512609 A | | 5/2007 | |
| JP | 2011-525677 A | | 9/2011 | |
| JP | 4808160 B2 | | 11/2011 | |
| JP | 5747066 B2 | | 7/2015 | |
| JP | 2020-106687 A | | 7/2020 | |
| WO | WO 2021/001735 A1 | | 1/2021 | |

* cited by examiner

| Data ID | Speech sentence | Date | Speech start time | Speech end time | Speaker ID | Speaker role | Input method |
|---|---|---|---|---|---|---|---|
| | | | | Meta information | | | |
| 1 | Hi A, work of 811... | 2019/8/1 | 10:15:48 | 10:15:51 | User 4 | Staff | Voice |
| 2 | OK | 2019/8/1 | 10:15:54 | 10:15:55 | User 2 | Leader | Voice |
| 3 | Hi A, It's B. 1220 Is... | 2019/8/1 | 10:22:51 | 10:22:56 | User 5 | Staff | Voice |
| ... | ... | ... | ... | ... | ... | ... | ... |
| n | Front desk: If there is equipment to be returned. | 2019/8/1 | 11:17:31 | 11:17:31 | User 6 | Front desk | Keyboard |

F I G. 2

| | Section ID | Communication data list |
|---|---|---|
| 331 | 1 | Data ID1, Data ID2 |
| 332 | 2 | Data ID3, Data ID4 |
| | ... | ... |
| 33N | N | Data IDn |

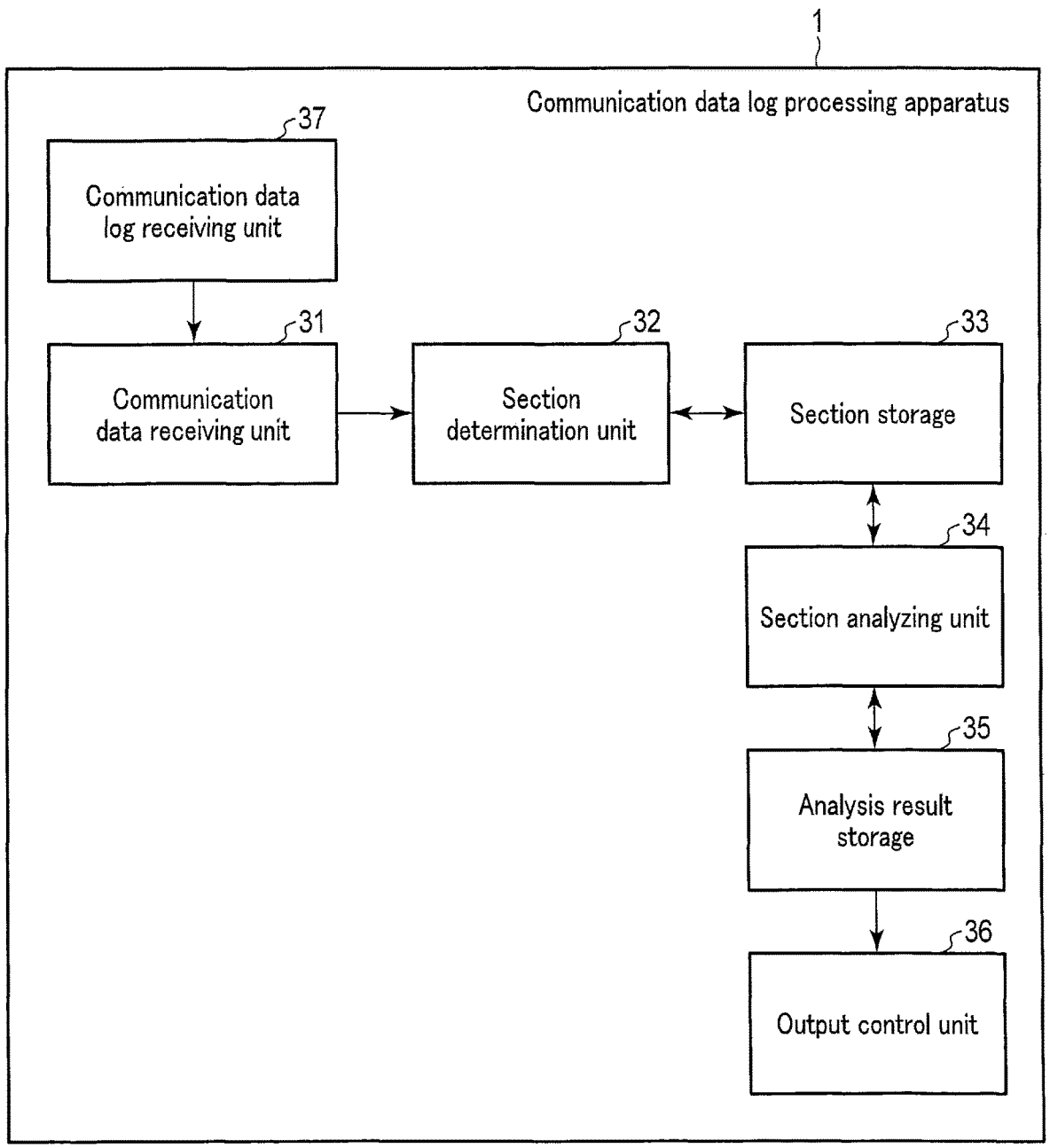
F I G. 10

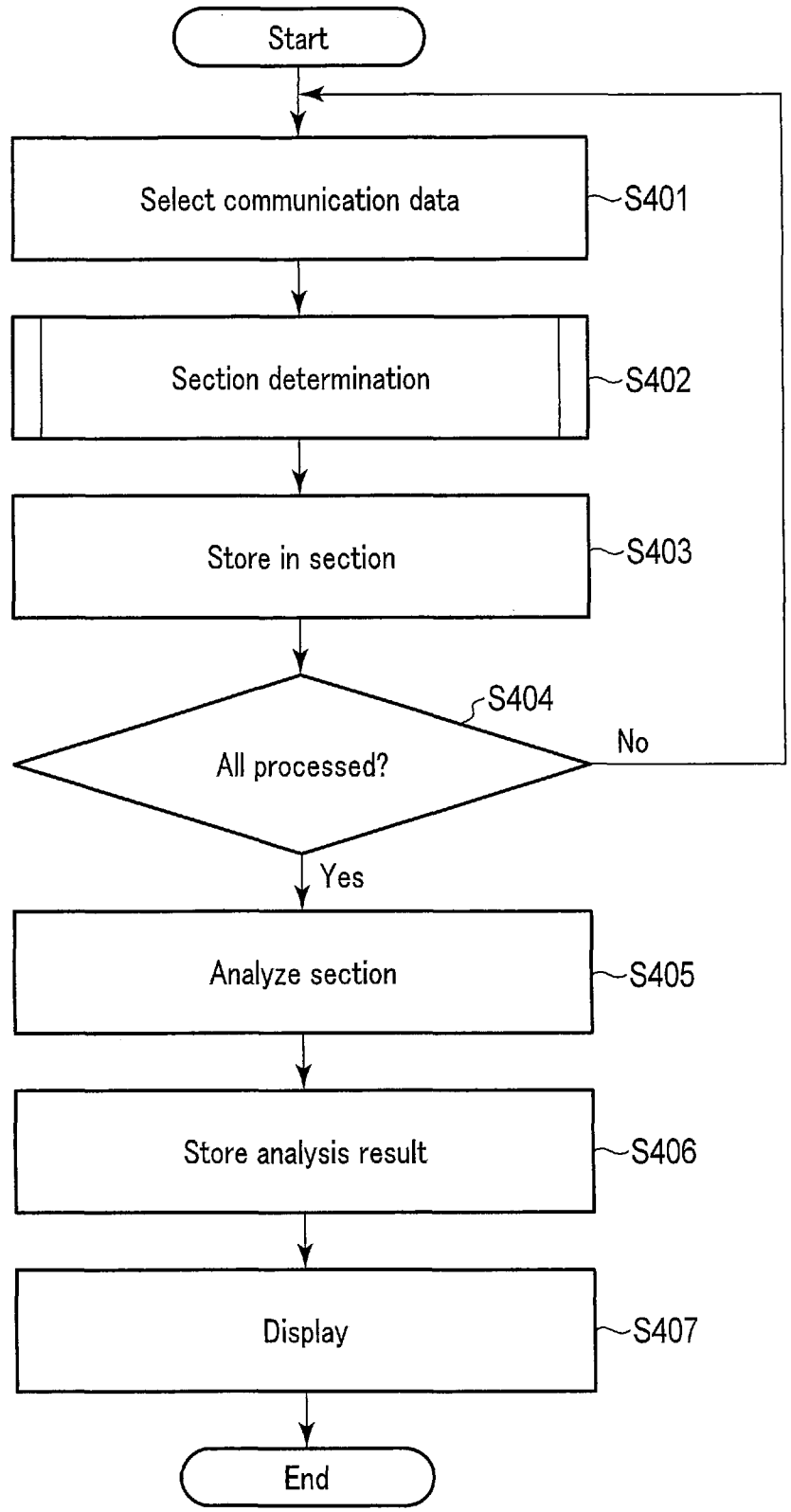
F I G. 11

COMMUNICATION DATA LOG PROCESSING APPARATUS, COMMUNICATION DATA LOG PROCESSING METHOD, AND STORAGE MEDIUM STORING PROGRAM

CROSS-REFERENCE TO RELATED APPLICATIONS

This application is based upon and claims the benefit of priority from the Japanese Patent Application No. 2021-142616, filed Sep. 1, 2021, the entire contents of which are incorporated herein by reference.

FIELD

Embodiments described herein relate generally to a communication data log processing apparatus, a communication data log processing method, and a storage medium storing a program.

BACKGROUND

IoT (Internet of Things) is advancing in fields in which people talk to each other, e.g., in field services such as hotel cleaning and security, and in fields of conferences. For example, IoT makes it possible to accumulate dialogues in field services and speech logs such as conference proceedings as a communication data log. The communication data log is a log of speeches uttered by one or more speakers about one or more subjects regardless of whether the speeches are voices or texts. The communication data log is sometimes accumulated when two speakers are discussing about the same subject, and sometimes accumulated when two pairs of four speakers are speaking about their respective subjects.

It is relatively easy to analyze a structured communication data log. If information useful to improve and streamline services can be extracted by analyzing the communication data log, it can be said that the communication data log is effectively utilized. Structuration of the communication data log is, e.g., dividing communication data into a section that is a group of the same subject. For example, if "understood" is uttered after "service A is complete" is uttered, the two utterances are related to the same subject "report of completion of service A", so they can be collected into the same section. As another example, when "please carry equipment B to room C" is uttered after "where do you want to carry equipment B?" is uttered, the two utterances are related to the same subject "carriage of equipment B", so they can be collected into the same section.

In general speeches, a subject can change as needed, and a plurality of subjects can progress in parallel. Also, a subject can change even in a continuous speech of the same speaker. Furthermore, a speech can contain both a spoken language and a written language. These characteristics probably make the communication data log difficult to structure.

BRIEF DESCRIPTION OF THE DRAWINGS

FIG. 2 is a view showing an example a communication data log;

FIG. 10 is a block diagram showing a configuration example of a communication data log processing apparatus according to a modification of the second embodiment; and FIG. 11 is a flowchart showing the operation of the communication data log processing apparatus according to the modification of the second embodiment.

DETAILED DESCRIPTION

In general, according to one embodiment, a communication data log processing apparatus includes a processor including hardware. The processor receives communication data contained in a communication data log as a log of the communication data containing a speech sentence and meta information. The processor determines a section to which the received communication data should belong based on the speech sentence and the meta information.

Embodiments will be explained below with reference to the accompanying drawings.

First Embodiment

Figure 1:
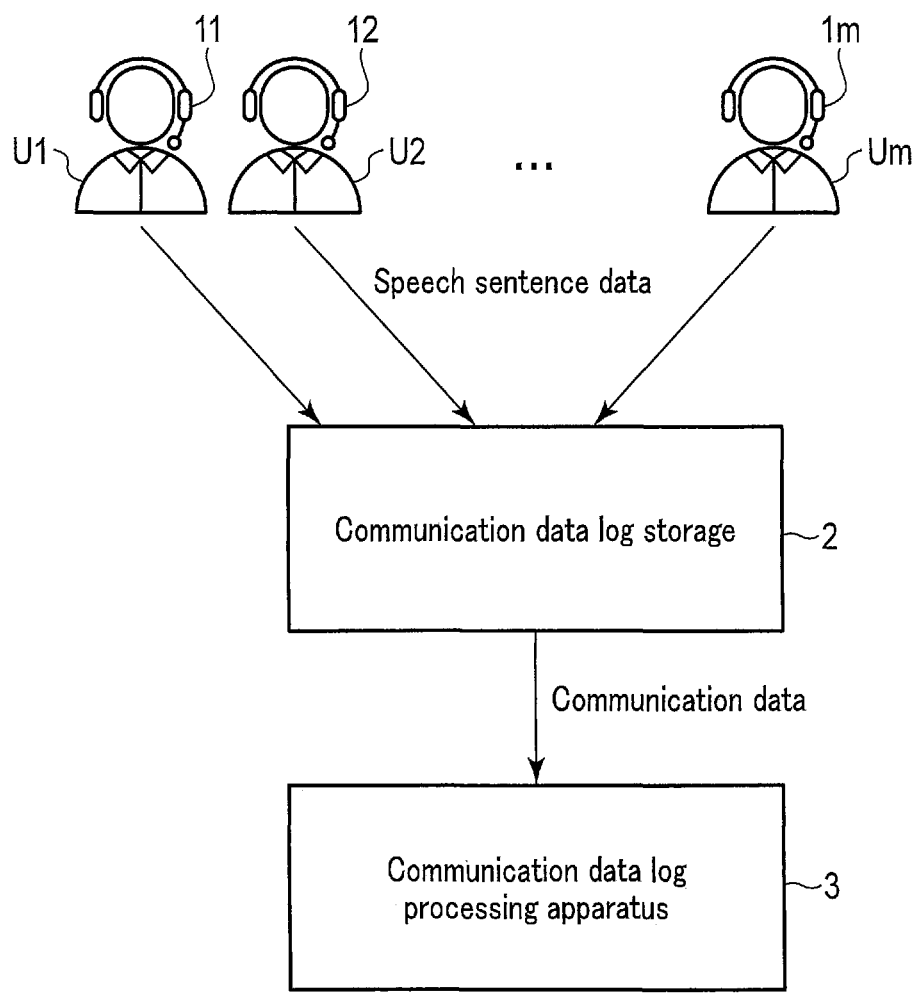
FIG. 1 is a view showing a configuration example of a system including a communication data log processing apparatus according to embodiments.

FIG. 1 is a view showing a configuration example of a system including a communication data log processing apparatus according to embodiments. This system according to the embodiments includes input devices 11 to 1m, a communication data log storage 2, and a communication data log processing apparatus 3.

The input devices 11 to 1m are m (m is a natural number) input devices for inputting speech sentences. For example, the input devices 11 to 1m are input devices for inputting speech sentences from corresponding ones of users U1 to Um. The input method of the input devices 11 to 1m is not limited provided that the devices can input speech sentences. For example, the input devices 11 to 1m can be devices for collecting voices of speech sentences input from users via microphones. As another example, the input devices 11 to 1m can be devices for collecting texts of speech sentences input from users via keyboards.

Each of the input devices 11 to 1m includes a communication module. When a speech sentence from a user is input, a corresponding one of the input devices 11 to 1m transmits the speech sentence data to the communication data log storage 2. The speech sentence data contains voice data or text data of the input speech sentence, the date/time at which the input of the voice or text of the speech sentence is started, the date/time at which the input is ended, and a device ID. The device ID is allocated to each of the input devices 11 to 1m.

Each of the input devices 11 to 1*m* can also be configured not only to transmit speech sentence data of the corresponding user to the communication data log storage 2, but also to transmit speech sentence data of the corresponding user to another input device, and to play back speech sentence data received from another input device.

As voice input type input devices 11 to 1*m*, it is possible to use field intercoms to be attached to the heads of the users U1 to Um. As text input type input devices 11 to 1*m*, it is possible to use, e.g., personal computers or tablet terminals including a text chat application. The input devices 11 to 1*m* are not limited to these devices. Referring to FIG. 1, the input devices are in one-to-one correspondence with the users. However, the input devices need not always be in one-to-one correspondence with the users. If the input devices are not in one-to-one correspondence with the users, it is desirable to be able to specify a user having spoken by a method such as voice recognition.

The communication data log storage 2 stores communication data logs generated based on speech sentence data transmitted from the input devices 11 to 1*m*. The communication data log is the record of a speech log of each of the users U1 to Um. FIG. 2 is a view showing an example of the communication data log. As shown in FIG. 2, the communication data log contains n (n is a natural number) communication data 21 to 2*n*.

Each of the communication data 21 to 2*n* contains a data ID, a speech sentence, and meta information.

The data ID is an ID allocated to each of the communication data 21 to 2*n*.

The speech sentence is text data indicating the contents of the speech sentence. When the speech sentence data contains voice data, the communication data log storage 2 extracts the speech sentence by voice recognition for the voice data. When the speech sentence data contains text data, the communication data log storage 2 extracts the speech sentence from the text data.

The meta information is information attached to the communication data, and contains various kinds of information related to the speech. The meta information can contain the date, the speech start time, the speech end time, a speaker ID, a speaker role, and an input method. The date is the date at which the corresponding speech sentence is uttered. The speech start time is the time at which the utterance of the corresponding speech sentence is started. The speech end time is the time at which the utterance of the corresponding speech sentence is ended. The speaker ID is an ID allocated to each user in order to identify the user having uttered the corresponding speech sentence. The speaker role is information of a role, such as an official position or a standpoint, for representing the relationship between a user having uttered the corresponding speech sentence and another user. The input method is an input method of an input device having collected the utterance of the corresponding speech sentence. The date, the speech start time, and the speech end time can be specified from, e.g., the speech sentence data collection date/time attached to the speech sentence data. The speaker ID, the speaker role, and the input method can be specified by collating the device ID attached to the speech sentence data with the speaker ID, the speaker role, and the input method registered beforehand in relation to the device ID. The meta information need only contain at least one of the six types of information shown in FIG. 2. The meta information can also contain information other than the six types of information shown in FIG. 2.

The communication data log processing apparatus 3 performs a process of structuring the communication data log stored in the communication data log storage 2 so that the communication data log becomes suitable for analysis. For example, the structuration of the communication data log according to the embodiments is to divide the communication data log into sections each of which is a group of the same subject.

Figures 3, 4:
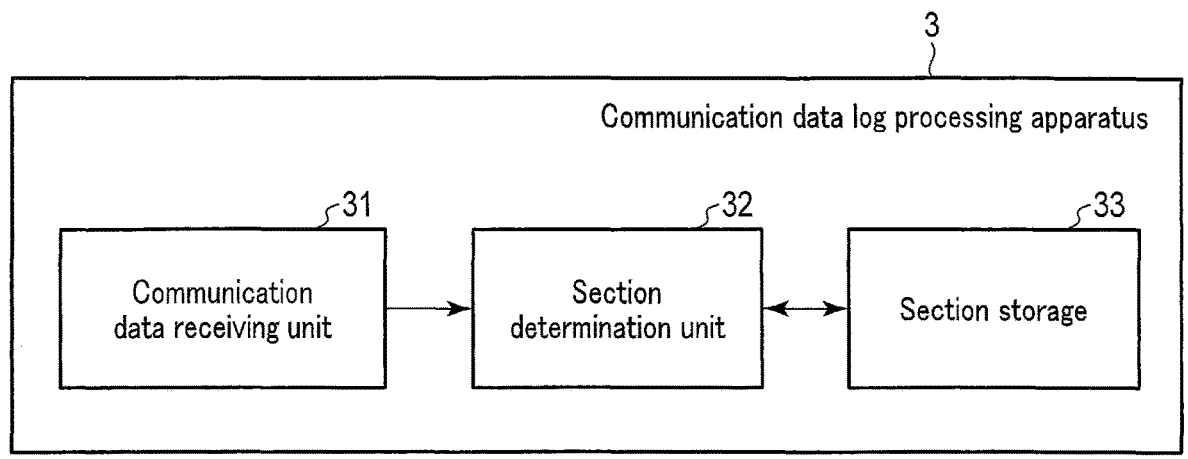
FIG. 3 is a block diagram showing a configuration example of a communication data log processing apparatus according to the first embodiment.
FIG. 4 is a view showing an example of a section list.

FIG. 3 is a block diagram showing a configuration example of the communication data log processing apparatus 3 according to the first embodiment. The communication data log processing apparatus 3 includes a communication data receiving unit 31, a section determination unit 32, and a section storage 33. The communication data log processing apparatus 3 can also be integrated with the communication data log storage 2.

The communication data receiving unit 31 receives one communication data from the communication data log storage 2. For example, whenever new communication data is registered in the communication data log storage 2, the communication data receiving unit 31 receives the new communication data.

The section determination unit 32 determines a section to which the communication data received by the communication data receiving unit 31 should belong. If the section determination unit 32 can determine a section, the section determination unit 32 causes the section to store the communication data. If the section determination unit 32 cannot determine a section, the section determination unit 32 forms a new section, and causes the new section to store the communication data. The section determination unit 32 performs the determination based on, e.g., an interval of speeches specified by the meta information of the communication data, and the relevance of the contents of the speech sentence of the communication data, which is specified by the speech sentence. Details of the section determination unit 32 will be explained later.

The section storage 33 collectively stores the communication data in the sections. The section storage 33 also stores a section list. The section list is management data indicating the contents of the sections. FIG. 4 is a view showing an example of the section list. As shown in FIG. 4, the section list contains N (N is a natural number) sections 331 to 33N. Each of the sections 331 to 33N contains a section ID and a communication data list. Note that the section storage 33 can also be implemented by another storage medium installed outside the communication data log processing apparatus 3. In this case, the communication data log processing apparatus 3 accesses the external storage medium as needed, thereby acquiring information from the section storage 33 and transferring information to the section storage 33.

The section ID is an ID allocated to each of the sections 331 to 33N.

The communication data list is a list of the data IDs of communication data belonging to corresponding sections.

Figure 5:
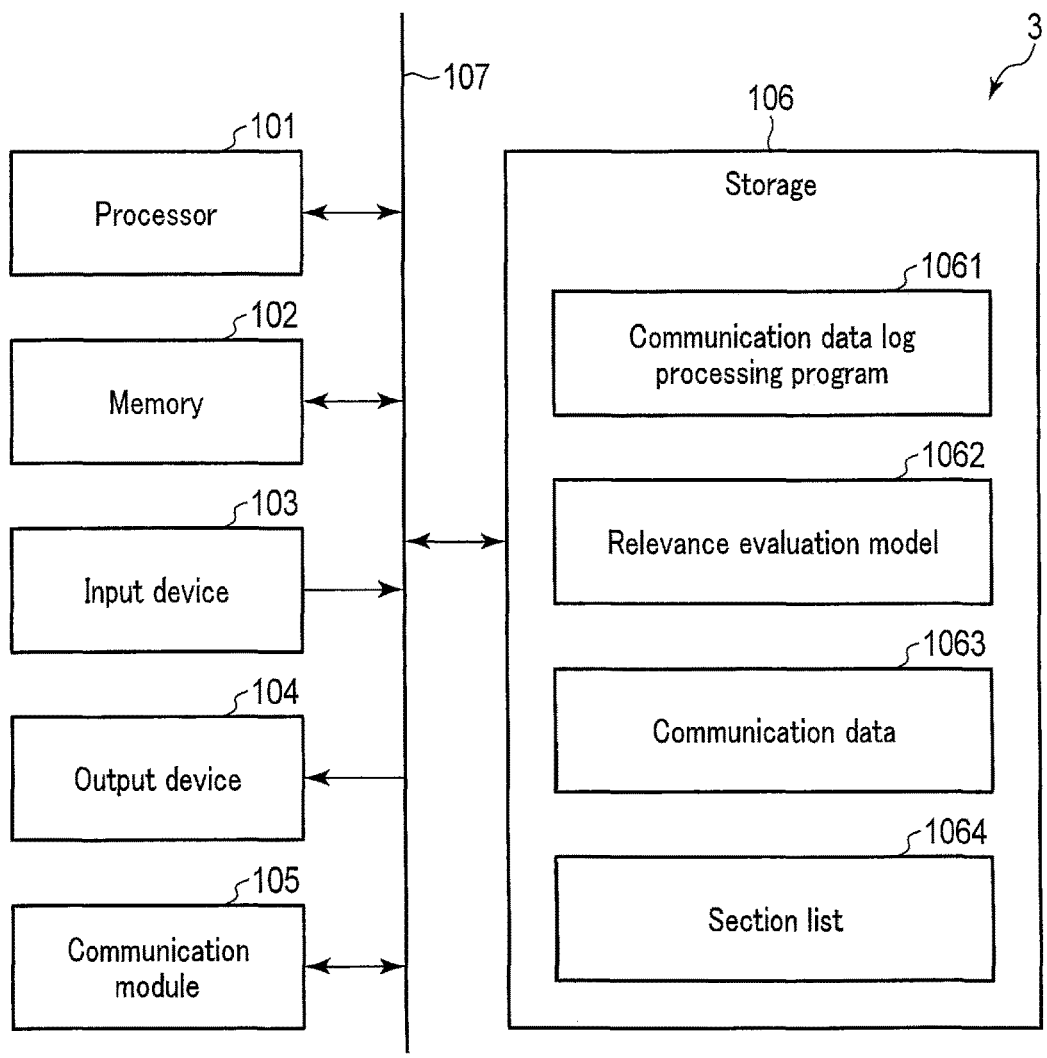
FIG. 5 is a view showing an example of the hardware configuration of the communication data log processing apparatus.

FIG. 5 is a view showing a hardware configuration example of the communication data log processing apparatus 3. The communication data log processing apparatus 3 is a computer and includes, as hardware, a processor 101, a memory 102, an input device 103, an output device 104, a communication module 105, and a storage 106. The processor 101, the memory 102, the input device 103, the output device 104, the communication module 105, and the storage 106 are connected to a bus 107.

The processor 101 controls the overall operation of the communication data log processing apparatus 3. The processor 101 operates as the communication data receiving unit 31 and the section determination unit 32 by executing programs stored in the storage 106. The processor 101 is a CPU or the like. The processor 101 can also be, e.g., an MPU, a GPU, an ASIC, or an FPGA. The processor 101 can be either a single CPU or a plurality of CPUS.

The memory 102 includes a ROM and a RAM. The ROM is a nonvolatile memory. The ROM stores, e.g., an activation program of the communication data log processing apparatus 3. The RAM is a volatile memory. The RAM is used as, e.g., a working memory when the processor 101 performs processing.

The input device 103 is an input device such as a touch panel, a keyboard, or a mouse. When the input device 103 is operated, a signal corresponding to the operation contents is input to the processor 101 via the bus 107. The processor 101 performs various processes in accordance with the signal.

The output device 104 is a device for outputting various kinds of information such as a display device, e.g., a liquid crystal display or an organic EL display, and a printer.

The communication module 105 is a communication module for allowing the communication data log processing apparatus 3 to communicate with an external device, e.g., the communication data log storage 2. The communication module 105 can be either a communication module for wired communication or a communication module for wireless communication.

The storage 106 is a storage such as a hard disk drive or a solid-state drive. The storage 106 stores various programs such as a communication data log processing program 1061 to be executed by the processor 101.

The storage 106 also stores a relevance evaluation model 1062. The relevance evaluation model 1062 is a machine learning model for evaluating the relevance between speech sentences. For example, the relevance evaluation model 1062 can be a deep learning model in which the weight of each layer is so learned as to output a score representing the relevance between two input speech sentences by comparing feature vectors extracted from the two speech sentences. The feature amount vector is extracted by, e.g., morphological analysis. The relevance evaluation model 1062 is given, as teacher data, information about the relevance between words assumed as speech sentences.

The relevance evaluation model 1062 can be a deep learning model that receives a character string obtained by connecting a speech sentence and the whole or a part of meta information, and outputs a score representing the relevance. The relevance evaluation model 1062 can also be a deep learning model that receives three or more speech sentences and outputs a score indicating the relevance. Meta information having different formats can be processed by connecting meta information as a character string to a speech sentence. In addition, global information can be processed by inputting three or more speech sentences. Furthermore, the relevance evaluation model 1062 need not always be a deep learning model. For example, the relevance evaluation model 1062 can be a model so configured as to evaluate the relevance between speech sentences based on a predetermined rule.

The storage 106 also operates as the section storage 33, and collectively stores communication data 1063 for each section. Furthermore, the storage 106 stores a section list 1064.

The relevance evaluation model 1062, the communication data 1063, and the section list 1064 can also be stored in an apparatus different from the communication data log processing apparatus 3. In this case, the communication data log processing apparatus 3 acquires necessary information by accessing the other apparatus by using the communication module 105.

The bus 107 is a data transfer path for exchanging data between the processor 101, the memory 102, the input device 103, the output device 104, the communication module 105, and the storage 106.

Figure 6:
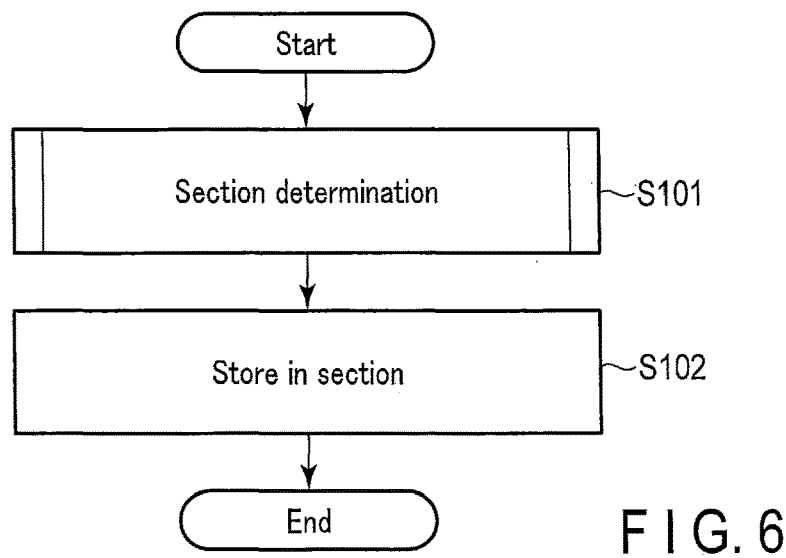
FIG. 6 is a flowchart showing the operation of the communication data log processing apparatus according to the first embodiment.

Next, the operation of the communication data log processing apparatus according to the first embodiment will be explained. FIG. 6 is a flowchart showing the operation of the communication data log processing apparatus according to the first embodiment. The process shown in FIG. 6 is performed whenever, e.g., the communication data receiving unit 31 receives communication data.

In step S101, the section determination unit 32 performs a section determination process for determining the section ID of a section in the section storage 33 to which communication data received by the communication data receiving unit 31 should belong. This section determination process will be explained in detail later. The explanation will be continued by assuming that the section to which the communication data should belong is determined.

In step S102, the section determination unit 32 stores the communication data received by the communication data receiving unit 31 in, e.g., the end portion of the section having the section ID determined by the section determination process in the section storage 33. Also, the section determination unit 32 stores the data ID of the newly stored communication data in the communication data list of the corresponding section ID in the section list. After that, the process shown in FIG. 6 is terminated. In this process, the section determination unit 32 does not store communication data found not to be classified by the section determination process (to be explained later) in any section. In this case, the process shown in FIG. 6 is immediately terminated. Furthermore, the section determination unit 32 forms a section having a new section ID for communication data found to be classified as a new section in the section determination process (to be explained later), and stores the communication data in the section. After that, the process shown in FIG. 6 is terminated.

Figure 7:
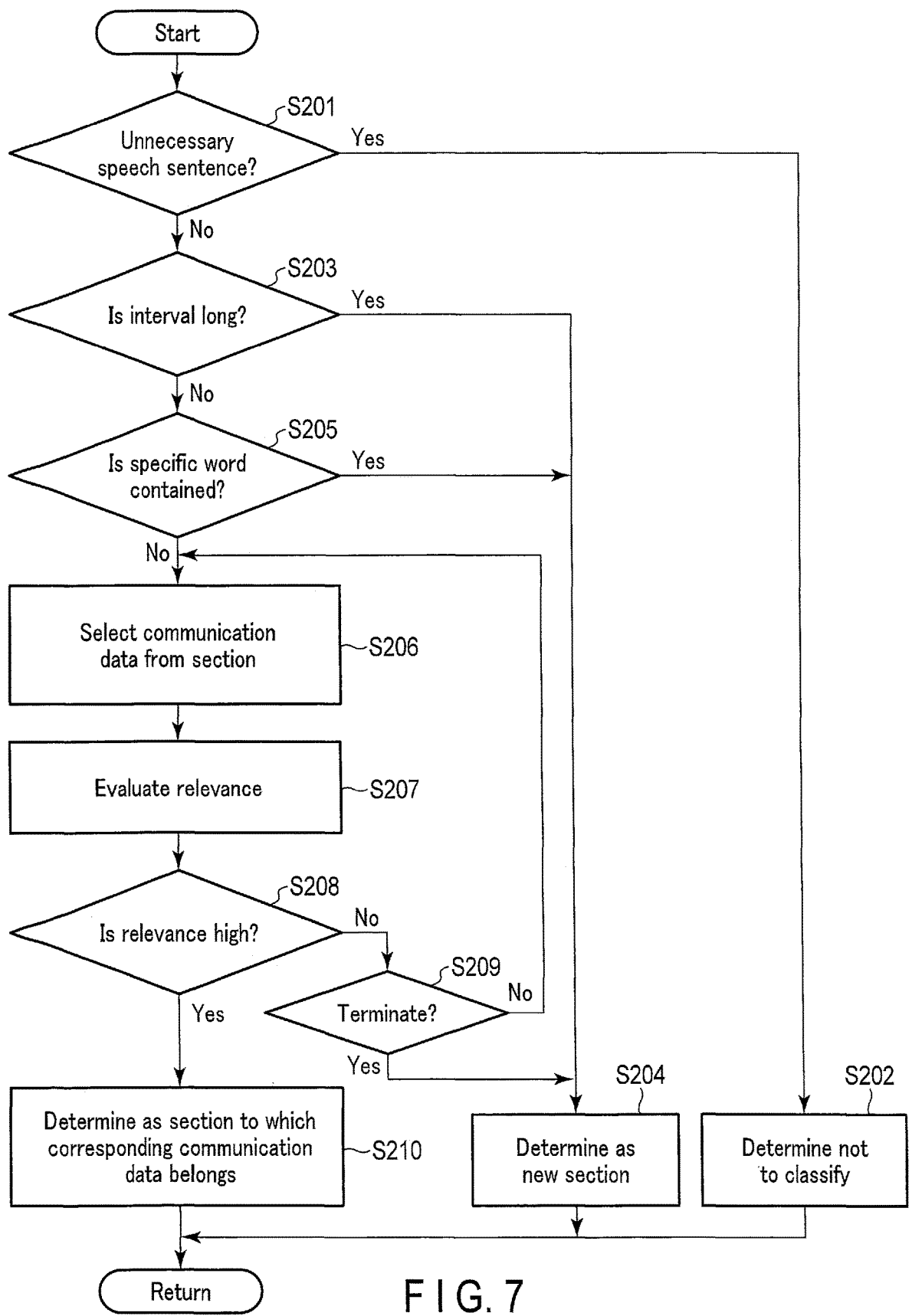
FIG. 7 is a flowchart showing a section determination process.

FIG. 7 is a flowchart showing the section determination process. In step S201, the section determination unit 32 determines whether a speech sentence of communication data received by the communication data receiving unit 31 is an unnecessary speech sentence. An unnecessary speech sentence is, e.g., a meaningless speech sentence input at a timing not intended by the user, or a speech sentence containing a word such as "test" clearly showing an unnecessary speech sentence. The section determination unit 32 holds a list of words clearly showing an unnecessary speech sentence in advance. The section determination unit 32 can also decompose a speech sentence into words by morphological analysis or the like, and determine whether the speech sentence is a meaningless speech sentence or contains a word clearly showing an unnecessary speech sentence. Alternatively, the section determination unit 32 can determine whether a speech sentence is an unnecessary speech sentence by a deep learning model. If it is determined in step S201 that the speech sentence is an unnecessary speech sentence, the process advances to step S202. If it is determined in step S201 that the speech sentence is not an unnecessary speech sentence, the process advances to step S203.

In step S202, the section determination unit 32 determines that the communication data received by the communication data receiving unit 31 is not to be classified as a section. After that, the process shown in FIG. 7 is terminated. That is, an unnecessary speech sentence is not classified as a section in this embodiment.

In step S203, the section determination unit 32 determines whether a speech interval from the speech end time of communication data lastly added to the section storage 33 to the speech start time of communication data received by the communication data receiving unit 31 is equal to or longer than a threshold. This threshold can be an appropriate value such as 5 min. If it is determined in step S203 that the speech interval of the communication data is longer, the process advances to step S204. The process also advances to step S204 when no section is formed in the section storage 33, i.e., when no communication data is stored. If it is determined in step S203 that the speech interval of the communication data is not longer, the process advances to step S205.

In step S204, the section determination unit 32 determines that the communication data received by the communication data receiving unit 31 is classified as a new section. After that, the process shown in FIG. 7 is terminated. That is, in this embodiment, a speech sentence uttered after a sufficiently long speech interval from an immediately preceding speech is classified as a new section because the relevance to other speech sentences is low.

In step S205, the section determination unit 32 determines whether the communication data received by the communication data receiving unit 31 is communication data containing a specific word to be classified as a new section. This specific word is a word changing the subject, e.g., "now" or "by the way". The specific word can be a word determined between users beforehand. If it is determined in step S205 that the communication data is communication data containing the specific word, the process advances to step S204. In this case, the communication data received by the communication data receiving unit 31 is classified as a new section. If it is determined in step S205 that the communication data is not communication data containing the specific word, the process advances to step S206.

In step S206, the section determination unit 32 selects one or more communication data from the section storage 33. For example, the section determination unit 32 selects communication data lastly added to the section storage 33. If the relevance evaluation model 1062 is so configured as to output a score from three or more speech sentences, the section determination unit 32 can select two or more communication data from the section storage 33.

In step S207, the section determination unit 32 evaluates the relevance between the speech sentence of the communication data received by the communication data receiving unit 31 and the speech sentence of the communication data selected from the section storage 33. As described above, the relevance can be evaluated based on a score obtained by inputting speech sentences of two or three or more communication data to the relevance evaluation model. As described above, a character string obtained by connecting a speech sentence and meta information may also be input to the relevance evaluation model.

In step S208, the section determination unit 32 determines whether the relevance between the speech sentence of the communication data received by the communication data receiving unit 31 and the speech sentence of the communication data selected from the section storage 33 is high. For example, if the score is equal to or larger than a threshold, it is determined that the relevance is high. If it is determined in step S208 that the relevance is not high, the process advances to step S209. If it is determined in step S208 that the relevance is high, the process advances to step S210.

In step S209, the section determination unit 32 determines whether to terminate the evaluation of the relevance. For example, if all communication data as relevance evaluation targets are selected from the section storage 33, it is determined to terminate the evaluation of the relevance. The communication data as a relevance evaluation target is, e.g., communication data lastly added to the section storage 33. The communication data as a relevance evaluation target can also be communication data having a speech end time that is a past predetermined time, e.g., 2 hours from the speech start time of communication data received by the communication data receiving unit 31, among the communication data stored in the section storage 33. Furthermore, the communication data as a relevance evaluation target can be all communication data stored in the section storage 33. If it is determined in step S209 that the evaluation of the relevance is not to be terminated, the process returns to step S206. In this case, the section determination unit 32 selects another communication data from the section storage 33. If it is determined in step S209 that the evaluation of the relevance is to be terminated, the process advances to step S204. In this case, the communication data received by the communication data receiving unit 31 is classified as a new section.

In step S210, the section determination unit classifies the communication data received by the communication data receiving unit 31 as a section to which communication data evaluated to have a high relevance belongs. After that, the process shown in FIG. 7 is terminated.

A practical example of the process shown in FIG. 7 will be explained below. Assume that the communication data receiving unit 31 has received communication data 21 from the communication data log shown in FIG. 2. In this case, the section determination unit 32 refers to the section list stored in the section storage 33. For example, the communication data 21 belongs to a new section if the section list is blank. In this case, the section determination unit 32 forms a section having a new section ID 1 in the section storage 33, and stores the communication data 21 in the head of the formed section. Also, the section determination unit 32 adds the data ID 1 of the communication data 21 to the communication data list of the section 331 having the section ID 1 in the section list.

Next, assume that the communication data receiving unit 31 has received communication data 22 from the communication data log shown in FIG. 2. Since the speech interval from the speech end time of the communication data 21 to the speech start time of the communication data 22 is shorter than the threshold, the section determination unit 32 evaluates the relevance between the speech sentences of the communication data 22 and 21. In FIG. 2, a speech sentence "Hi A, a work of 811 . . . " by [user 4] contained in the communication data 21 and a speech sentence "OK" by [user 2] contained in the communication data 22 have a relationship that [A] as [user 2] responds to the contact from [user 4] to [user 2]. Therefore, it is determined that the relevance between the speech sentence of the communication data 22 and the speech sentence of the communication data 21 is high. When a character string of meta information is connected to a speech sentence, the speaker role indicates that [user 2] is the boss of [user 4], and the speech input methods are the same. Accordingly, it is determined that the relevance between the speech sentence of the communication data 21 and the speech sentence of the communication data 22 is high. Therefore, the section determination unit 32 adds the communication data 22 to the end of the section having the section ID 1. Furthermore, the section determination unit 32 adds the data ID 2 of the communication data 22 to the communication data list of the section 331 having the section ID 1 in the section list.

Assume also that the communication data receiving unit 31 has received communication data 23 from the communication data log shown in FIG. 2. Since the speech interval from the speech end time of the communication data 22 to the speech start time of the communication data 23 is shorter than the threshold, the section determination unit 32 evaluates the relevance of the speech sentences of the communication data 23 and the communication data 22. Referring to FIG. 2, a speech sentence "OK" by [user 2] contained in the communication data 22 and a speech sentence "Hi A, it's B. 1220 is . . . " by [user 5] contained in the communication data 23 are speech sentences about different subjects, so it is determined that the relevance between the speech sentence of the communication data 23 and the speech sentence of the communication data 22 is low. Accordingly, the communication data 23 belongs to a new section. In this case, the section determination unit 32 forms a section having a new section ID 2 in the section storage 33, and stores the communication data 23 in the head of the formed section. In addition, the section determination unit 32 adds the data ID 3 of the communication data 23 to the communication data list of the section 332 having the section ID 2 in the section list.

After that, the section determination unit 32 similarly processes communication data received by the communication data receiving unit 31, and stores the processed data in the section storage 33.

In the first embodiment as explained above, the communication data log is easily structured by using not only the contents of speech sentences of communication data accumulated in the communication data log but also meta information attached to the communication data. For example, communication data having a long speech interval is classified as a new section before the relevance of a speech sentence is evaluated. This can reduce communication data for which the relevance of a speech sentence must be evaluated. This makes it possible to increase the speed of processing of the section determination unit 32. Also, meta information is taken into consideration in addition to a speech sentence. Accordingly, communication data can be collected into an appropriate section even when, e.g., a subject changes as needed or a plurality of subjects progress in parallel.

In addition, communication data containing an unnecessary speech sentence is not classified as a section, and communication data containing a speech sentence that contains a specific word to be classified as a new section is classified as a new section before the relevance of the speech sentence is evaluated. This can also reduce communication data for which the relevance of a speech sentence must be evaluated. This also makes it possible to increase the speed of the processing of the section determination unit 32.

In the first embodiment, the section determination unit 32 can display the section list on a display device as the output device 104, and print out the section list by using a printer. Also, when a given data ID in the communication data list is selected while the display device is displaying the section list, the section determination unit 32 can further display the contents of communication data corresponding to the data ID.

Second Embodiment

Figure 8:
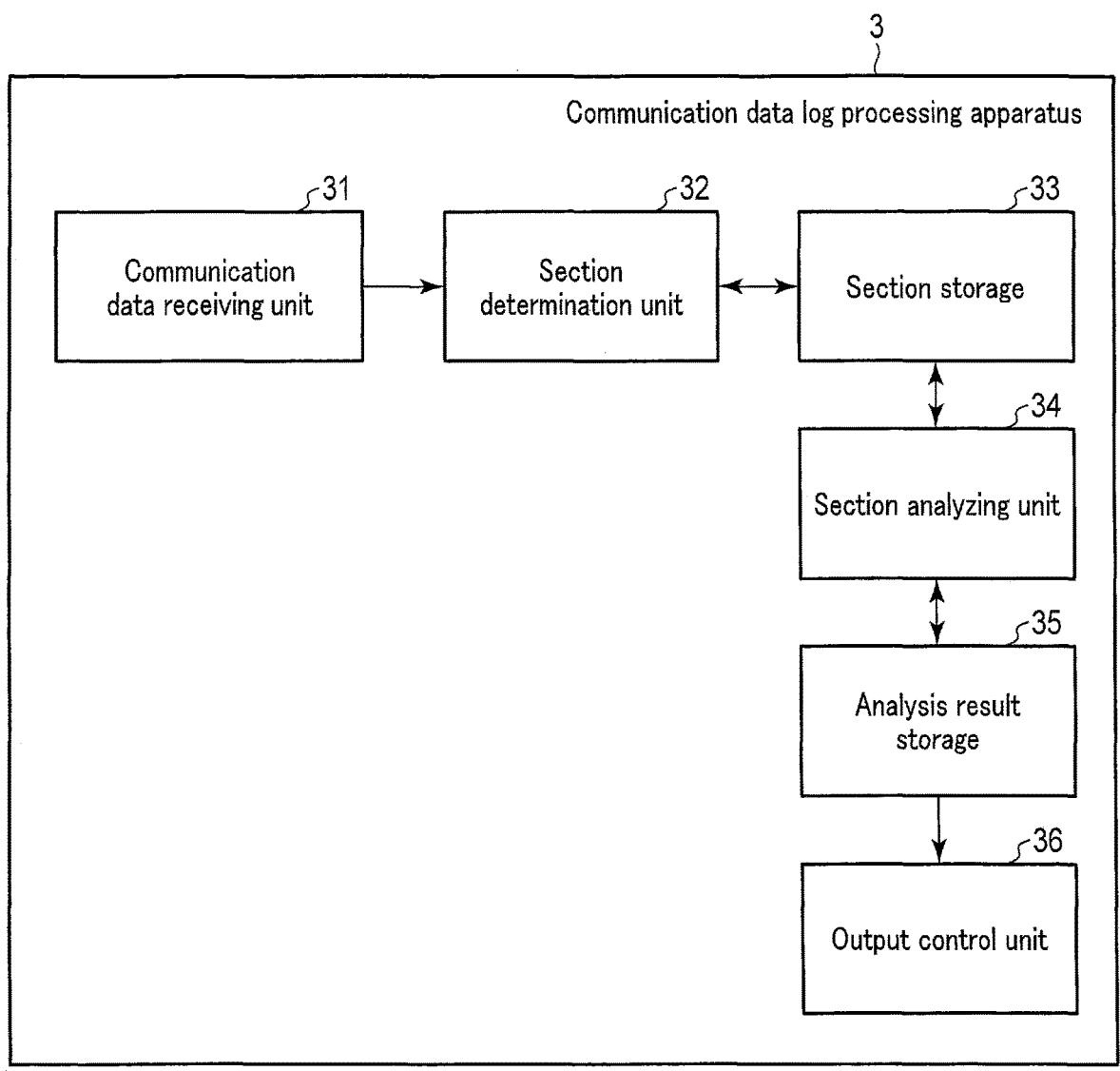
FIG. 8 is a block diagram showing a configuration example of a communication data log processing apparatus according to the second embodiment.

The second embodiment will be explained below. In the second embodiment, an explanation of the same components and operations as those of the first embodiment will be omitted or simplified. FIG. 8 is a block diagram showing a configuration example of a communication data log processing apparatus 3 according to the second embodiment. The communication data log processing apparatus 3 includes a section analyzing unit 34, an analysis result storage 35, and an output control unit 36, in addition to a communication data receiving unit 31, a section determination unit 32, and a section storage 33. The communication data receiving unit 31, the section determination unit 32, and the section storage 33 are the same as those explained in the first embodiment, so an explanation thereof will be omitted. A processor 101 operates as the section analyzing unit 34 and the output control unit 36, in addition to the communication data receiving unit 31 and the section determination unit 32, by executing programs stored in a storage 106. The storage 106 operates as the analysis result storage 35 in addition to the section storage 33.

The section analyzing unit 34 analyzes communication data of each section by referring to a section list stored in the section storage 33. For example, the section analyzing unit 34 analyzes communication data of each section and gives the section an attribute representing the contents of dialogue in the section. Note that the analysis for giving an attribute can be performed by a deep learning model having learned the relationships between communication data and attributes. An attribute to be given by the section analyzing unit 34 is a predetermined attribute such as "instruction", "completion report", or "trouble report". The section analyzing unit 34 can also analyze, e.g., the busyness and the trouble occurrence frequency in each time zone by counting speech sentences in communication data in each time zone. Furthermore, the section analyzing unit 34 can extract a task by analyzing communication data of each section and visualize the extracted task by linking the task to a speaker ID, or can further perform another analysis by linking a relevant section and counting meta information for each relevant section.

The analysis result storage 35 stores the analysis result of a section input from the section analyzing unit 34.

The output control unit 36 displays the analysis result stored in the analysis result storage 35 on the screen of a display device as the output device 104, or prints out the analysis result on a sheet of paper by using a printer. The analysis result can also be displayed on a browser. In addition to the analysis result, the output control unit 36 can also display or print out information having largely contributed to the determination of the analysis result.

Figure 9:
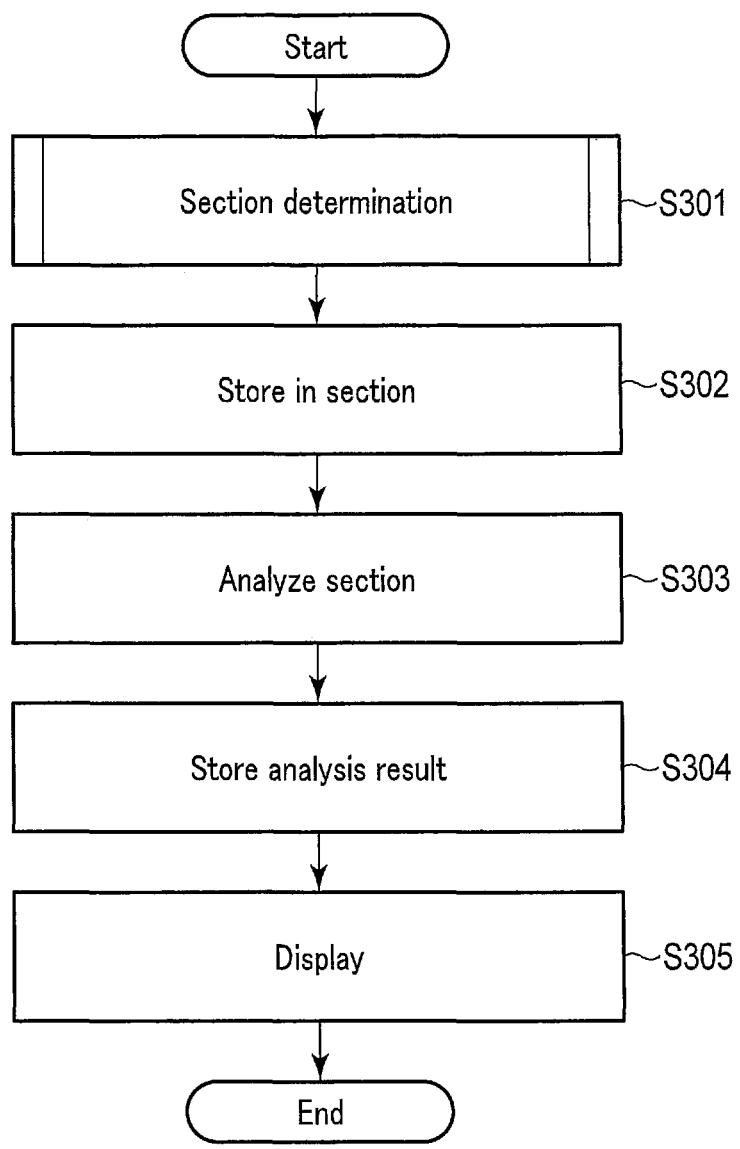
FIG. 9 is a flowchart showing the operation of the communication data log processing apparatus according to the second embodiment.

Next, the operation of the communication data log processing apparatus according to the second embodiment will be explained. FIG. 9 is a flowchart showing the operation of the communication data log processing apparatus according to the second embodiment. This processing shown in FIG. 9 is performed whenever the communication data receiving unit 31 receives communication data. Processes in steps S301 and S302 of FIG. 9 are performed in the same manner as the processes in steps S101 and S102 of FIG. 6, so an explanation thereof will be omitted.

In step S303 after communication data is stored in a section, the section analyzing unit 34 analyzes the communication data by referring to the section list stored in the section storage 33. For example, the analysis for giving an attribute to a section is performed by connecting meta information and speech sentences of communication data contained in the section and inputting the connected meta information and speech sentences to a deep learning model. The analysis for giving an attribute to a section can also be performed by inputting communication data to a deep learning model one by one, and taking majority vote of the attributes given to the individual communication data.

It is also possible to divide attributes given to sections into several classes and count, in each time zone, the appearance frequencies of sections having attributes included in each class. Consequently, the analysis result of each class in each time zone can be obtained. Assume that attributes to be given are three attributes "instruction", "completion report", and "trouble report", a routine work class includes "instruction" and "completion report", and a non-routine work class includes "trouble report". In this case, an analysis result obtained from the routine work class represents the busyness of a task, and an analysis result obtained from the non-routine work class represents the presence/absence of trouble occurrence. A class can manually be set in advance, and can also be set by a statistical method.

In step S305, the section analyzing unit 34 stores the analysis result in the analysis result storage 35.

In step S306, the output control unit 36 displays the analysis result stored in the analysis result storage 35 on a display device as the output device 104. When displaying the analysis result, the output control unit 36 can also display information having largely contributed to the determination of the analysis result. An example of the information having largely contributed to the determination of the analysis result is a word or meta information having largely contributed to the determination of an attribute of a section. The output control unit 36 can also display a specific word or specific meta information in addition to the information having largely contributed to the determination. Furthermore, the output control unit 36 can emphatically display information instead of simply displaying it. When using this emphatical display, the user of the analysis result can intuitively interpret and visually understand the analysis result more easily.

According to the second embodiment as explained above, a communication data log is structured and the structured communication data log is analyzed. This can more directly provide the user with information that helps improve and streamline the work. Also, whenever communication data is accepted, classification to sections is sequentially performed as the structuration of a communication data log, so the communication data log can be analyzed in real time. This real-time analysis of the communication data log makes it possible to detect temporary load centralization and perform load dispersion.

Modification of The Second Embodiment

A modification of the second embodiment will be explained below. In this modification of the second embodiment, an explanation of the same components and operations as those of the second embodiment will be omitted or simplified. FIG. 10 is a block diagram showing a configuration example of a communication data log processing apparatus 3 according to the modification of the second embodiment. The communication data log processing apparatus 3 includes a communication data log receiving unit 37, in addition to a communication data receiving unit 31, a section determination unit 32, a section storage 33, a section analyzing unit 34, an analysis result storage 35, and an output control unit 36.

The communication data log receiving unit 37 receives a communication data log containing two or more communication data from a communication data log storage 2. Then, the communication data log receiving unit 37 inputs the communication data contained in the received communication data log to the communication data receiving unit 31 one by one.

Next, the operation of the communication data log processing apparatus according to the modification of the second embodiment will be explained below. FIG. 11 is a flowchart showing the operation of the communication data log processing apparatus according to the modification of the second embodiment. This processing shown in FIG. 11 is performed whenever the communication data log receiving unit 37 receives a communication data log.

In step S401, the communication data log receiving unit 37 selects one communication data from the communication data log. For example, the communication data log receiving unit 37 selects communication data in the order of data IDs. Then, the communication data log receiving unit 37 inputs the selected communication data to the communication data receiving unit 31.

Processes in steps S402 and S403 after the communication data receiving unit 31 received the communication data are performed in the same manner as the processes in steps S101 and S102 of FIG. 6, so an explanation thereof will be omitted.

In step S404, the section determination unit 32 determines whether the process of storing all communication data contained in the communication data log received by the communication data log receiving unit 37 to sections is complete. If it is determined in step S404 that the process on all the communication data is incomplete, the process returns to step S401. In this case, the communication data log receiving unit 37 selects another communication data. If it is determined in step S404 that the process on all the communication data is complete, the process advances to step S405.

Processes in steps S405 to S407 of FIG. 11 are performed in the same manner as the processes in steps S303 to S305 of FIG. 9, so an explanation thereof will be omitted.

In the modification of the second embodiment as explained above, the communication data log processing apparatus 3 can receive a communication data log as an input, and collectively structure a plurality of communication data. Accordingly, analysis can also be collectively performed. For example, when analysis in one day is collectively performed, the task amount, the task dispersion degree, and the like of each user in one day are analyzed. An analysis result like this can be used in personnel distribution and task assignment on the next day.

Instructions shown in the procedures explained in the above-described embodiments can be executed based on a program as software. When a versatile computer system prestores this program and loads the program, the same effects as those of the above-described data log processing apparatus can be obtained. The instructions described in the above embodiments are recorded as a computer-executable program in a magnetic disk (e.g., a flexible disk or a hard disk), an optical disk (e.g., a CD-ROM, a CD-R, a CD-RW, a DVD-ROM, a DVD+R, a DVD+RW, or a Blu-ray Disc), a semiconductor memory, or a similar recording medium. The storage format can be any form as long as the recording medium is readable by a computer or an embedded system. A computer can implement the same operation as that of the data processing apparatus of the above-described embodiment by loading the program from this recording medium and, based on the program, causing a CPU to execute the instructions described in the program. When acquiring or loading the program, the computer can of course acquire or load the program across a network.

Also, based on the instructions of the program installed in a computer or an embedded system from the recording medium, an OS (Operating System) or database management software operating on the computer or a MW (MiddleWare) such as a network can execute a part of each processing in order to implement this embodiment.

Furthermore, the recording medium of this embodiment is not limited to a medium independent of a computer or an embedded system, but includes a recording medium that downloads a program transmitted across, e.g., a LAN or the Internet and stores or temporarily stores the program.

Also, the recording medium is not limited to one medium, and the recording medium of this embodiment includes a case in which the processes of this embodiment are executed from a plurality of media. The configuration of each medium can be any configuration.

Note that the computer or the embedded system according to this embodiment executes each processing of this embodiment based on the program stored in the recording medium, and can be either a single device such as a personal computer or a microcomputer, or a system in which a plurality of devices are connected across a network.

Note also that the computer according to this embodiment is not limited to a personal computer but includes an arithmetic processing device included in an information processing apparatus, a microcomputer, and the like. That is, the "computer" according to this embodiment is a general term of apparatuses and devices capable of implementing the functions of this embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication data log processing apparatus, comprising:
processing circuitry configured to:
receive communication data contained in a communication data log as a log of the communication data, the communication data containing a speech sentence and meta information; and
determine a section to which the received communication data should belong, based on the speech sentence and the meta information, the section being a group of a same subject,
wherein the processing circuitry is further configured to determine the section to which the received communication data should belong, based on a relevance between a first character string obtained by connecting a first speech sentence and first meta information contained in the received communication data and a second character string obtained by connecting a second speech sentence and second meta information contained in second communication data among communication data collected in a first section, the relevance being determined by a trained machine-learning model receiving the first and second character strings as inputs.

2. The apparatus according to claim 1, further comprising a memory to collectively store the communication data for each determined section.

3. The apparatus according to claim 1, wherein the meta information contains at least one of:
a date when the speech sentence is uttered;
a speech start time at which an utterance of the speech sentence is started;
a speech end time at which the utterance of the speech sentence is ended;
a speaker ID identifying a speaker having uttered the speech sentence;
a speaker role representing a role of a speaker having uttered the speech sentence; or
an input method of the speech sentence.

4. The apparatus according to claim 1, wherein the processing circuitry is further configured to analyze the communication data collected for each section.

5. The apparatus according to claim 4, wherein the processing circuitry is further configured to output a result of the analysis to an output device.

6. The apparatus according to claim 1, wherein the processing circuitry is further configured to sequentially determine the section to which the received communication data should belong.

7. The apparatus according to claim 1, wherein the processing circuitry is further configured to receive the communication data log.

8. The apparatus according to claim 7, wherein the processing circuitry is further configured to select the communication data one after another from the communication data log.

9. The apparatus according to claim 1, wherein
when the relevance between the first speech sentence contained in the received communication data and the second speech sentence contained in the second communication data is greater than a threshold, the processing circuitry is further configured to determine that the section to which the first communication data should belong is the first section, and
when the relevance between the first speech sentence and the second speech sentence is below the threshold, the processing circuitry is further configured to determine that the section to which the first communication data should belong is a second, new section.

10. The apparatus according to claim 1, wherein when the speech sentence contained in the received communication data contains a specific word, the processing circuitry is further configured to determine that the section to which the received communication data should belong is a new section.

11. The apparatus according to claim 1, wherein when the received communication data contains an unnecessary speech sentence, the processing circuitry is further configured to not determine the section to which the communication data should belong.

12. The apparatus according to claim 1, wherein
the meta information contains a speech start time at which an utterance of the speech sentence is started, and a speech end time at which the utterance of the speech sentence is ended, and
when a speech interval as a time interval from the speech start time of the received communication data to the speech end time of communication data lastly collected to a section is not less than a threshold, the processing circuitry is further configured to determine that the section to which the received communication data should belong is a new section, before determination based on the speech sentence and the meta information.

13. The communication data log processing apparatus of claim 1, wherein the processing circuitry is further configured to analyze the received communication data for each section, and display, on a display, a result of the analysis.

14. A communication data log processing method, comprising:
- receiving communication data contained in a communication data log as a log of the communication data, the communication data containing a speech sentence and meta information; and
- determining a section to which the received communication data should belong, based on the speech sentence and the meta information, the section being a group of a same subject,
- wherein the determining step further comprises determining the section to which the received communication data should belong, based on a relevance between a first character string obtained by connecting a first speech sentence and first meta information contained in the received communication data and a second character string obtained by connecting a second speech sentence and second meta information contained in second communication data among communication data collected in a first section, the relevance being determined by a trained machine-learning model receiving the first and second character strings as inputs.

15. A non transitory storage medium storing a computer readable communication data log processing program for causing a computer to execute:
- receiving communication data contained in a communication data log as a log of the communication data, the communication data containing a speech sentence and meta information; and
- determining a section to which the received communication data should belong based on the speech sentence and the meta information, the section being a group of a same subject,
- wherein the determining step further comprises determining the section to which the received communication data should belong, based on a relevance between a first character string obtained by connecting a first speech sentence and first meta information contained in the received communication data and a second character string obtained by connecting a second speech sentence and second meta information contained in second communication data among communication data collected in a first section, the relevance being determined by a trained machine-learning model receiving the first and second character strings as inputs.

* * * * *